US006821055B2

(12) United States Patent
Oram

(10) Patent No.: US 6,821,055 B2
(45) Date of Patent: Nov. 23, 2004

(54) MARINE BUOYANCY MODULES AND UNITS

(75) Inventor: Robert Kenneth Oram, Aberdeen (GB)

(73) Assignee: CRP Group Limited, Lancashire (GB)

( * ) Notice: Subject to any disclaimer, the term of this patent is extended or adjusted under 35 U.S.C. 154(b) by 0 days.

(21) Appl. No.: 10/244,395

(22) Filed: Sep. 17, 2002

(65) Prior Publication Data

US 2003/0068941 A1 Apr. 10, 2003

(30) Foreign Application Priority Data

Sep. 17, 2001 (GB) .............................................. 0122417

(51) Int. Cl.⁷ .............................................. E21B 17/01
(52) U.S. Cl. ................. 405/195.1; 405/211; 405/224.2; 166/350; 166/367; 441/133
(58) Field of Search ............................. 405/195.1, 162, 405/211, 224.2, 224.4, 205, 224, 63, 64; 166/350, 367; 441/30; 114/243, 264

(56) References Cited

U.S. PATENT DOCUMENTS

| 3,773,090 | A | | 11/1973 | Ghersa et al. |
|---|---|---|---|---|
| 4,477,207 | A | * | 10/1984 | Johnson .................... 405/195.1 |
| 4,505,617 | A | * | 3/1985 | Miller et al. ................. 405/211 |
| 4,634,314 | A | * | 1/1987 | Pierce ..................... 405/224.2 |
| 4,768,455 | A | * | 9/1988 | Maxson et al. ............. 114/264 |
| 5,165,821 | A | * | 11/1992 | Fischer et al. ................ 405/63 |
| 5,195,843 | A | * | 3/1993 | George et al. ................ 405/63 |
| 5,226,751 | A | * | 7/1993 | Doleshal .................. 405/211.1 |
| 5,722,794 | A | | 3/1998 | Friederich et al. |
| 5,875,728 | A | * | 3/1999 | Ayers et al. ................. 114/264 |
| 6,004,074 | A | * | 12/1999 | Shanks, II ................ 405/195.1 |
| 6,030,145 | A | | 2/2000 | Stewart, Jr. et al. |
| 6,155,748 | A | | 12/2000 | Allen et al. |
| 6,199,595 | B1 | * | 3/2001 | Baker .......................... 138/149 |
| 6,213,157 | B1 | | 4/2001 | Thiebaud et al. |
| 6,435,775 | B1 | * | 8/2002 | Nish et al. ................ 405/224.2 |
| 6,457,527 | B2 | * | 10/2002 | Wells ......................... 166/350 |
| 6,551,029 | B2 | * | 4/2003 | Shu et al. ..................... 405/211 |
| 2002/0115365 | A1 | * | 8/2002 | Nish et al. ................ 405/195.1 |

FOREIGN PATENT DOCUMENTS

EP              375118         *  6/1990  ................. 114/243

* cited by examiner

Primary Examiner—Jong-Suk Lee
(74) Attorney, Agent, or Firm—Clark & Brody

(57) ABSTRACT

A cylindrical buoyancy unit is composed of separate sections which are held together to surround a marine object such as a riser or pipe with additional conduits. The sections combine to define an internal cavity which is shaped to conform with the marine object. Each unit section is a thermosetting resin composite with a bulk interior of syntactic foam and an outer layer of different characteristics and an intermediate reinforcement layer. The intermediate layer is disposed close to the outer layer and is mechanically embedded but not tightly bonded into the structure. The intermediate layer is made as a mesh of high strength polymer fibers.

6 Claims, 2 Drawing Sheets

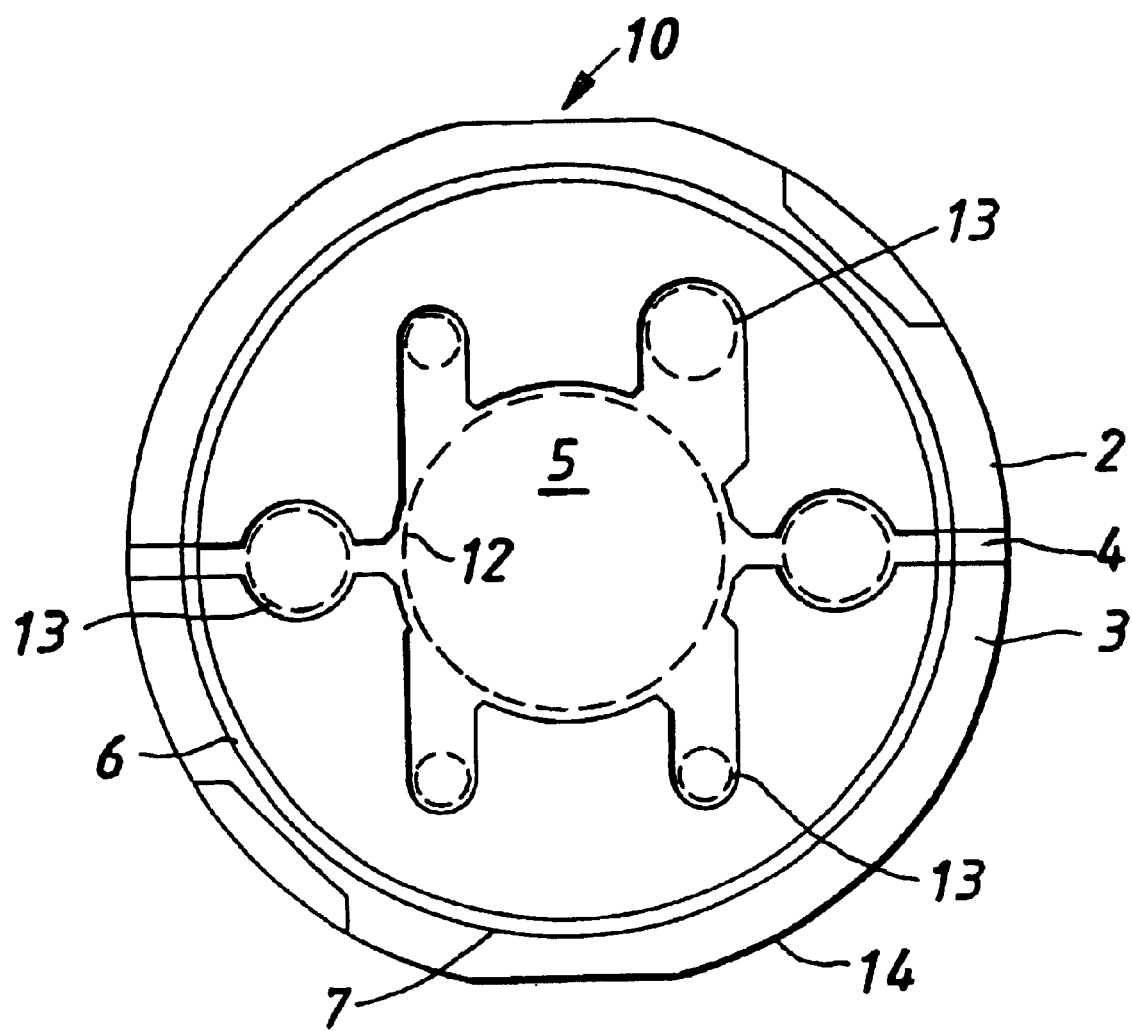

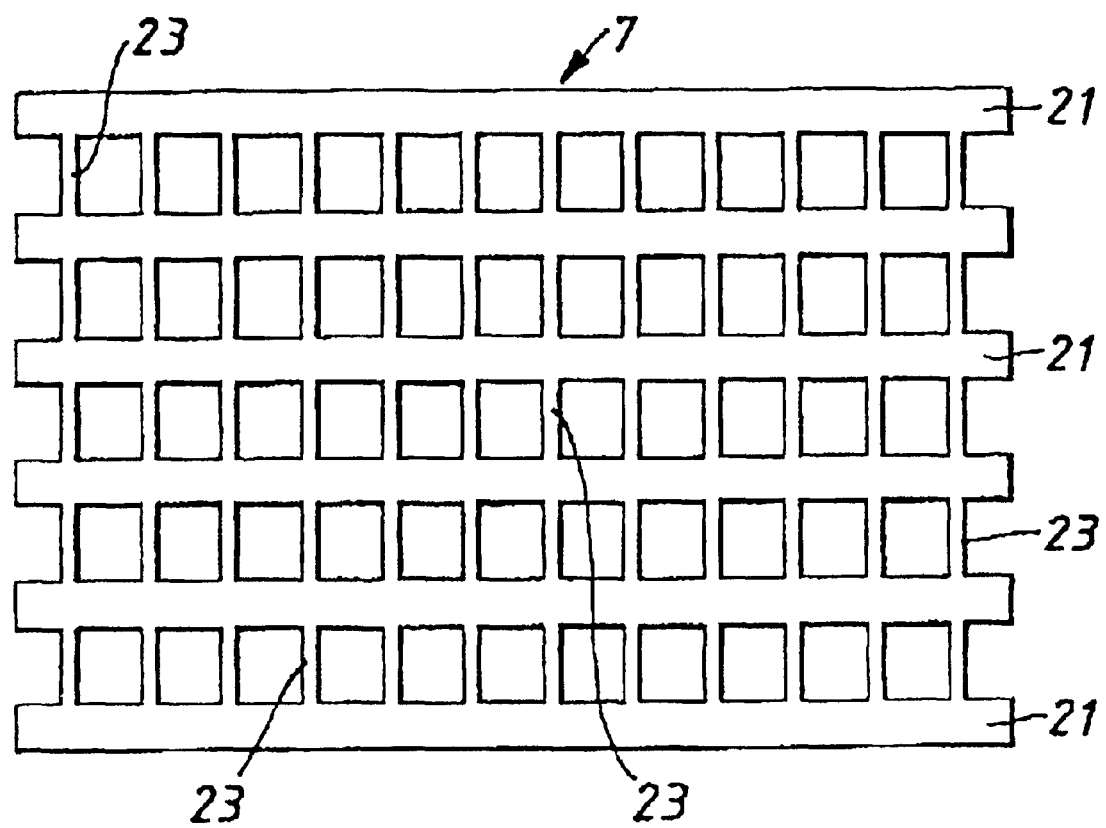

MARINE BUOYANCY MODULES AND UNITS

This application claims priority under 35 U.S.C. §§ 119 and/or 365 to 0122417.9, filed in Great Britain on 17 Sept. 2001; the entire content of which is hereby incorporated by reference.

FIELD OF THE INVENTION

The present invention is concerned with units and modules used primarily to impart buoyancy to marine objects and secondarily to protect such objects.

BACKGROUND OF THE INVENTION

Exploration drilling is increasingly taking place in areas of high ocean currents and deep water. When drilling in deep water the suspended weight of the drill string affects the stability of the drillship. The weight also potentially exceeds the tensile strength of the riser string so the majority of the submerged weight of the drill string needs to be balanced off by use of strap on buoyancy modules fabricated from low-density syntactic foam.

During string running/recovery operations, when the drill string is suspended from the drilling rig rather than coupled to the seabed wellhead, subsurface currents act on the drill string to deflect it from vertical. At the same time, surface wave conditions can cause a degree of movement. The drill string moves away from its central position through, and towards the edges of, the rotary table aperture. When the riser joint is "dressed", the energy of the impact between the riser assembly and the rotary table is taken by the syntactic foam, through variable degrees of mechanical damage. The modules provide sacrificial protection for the otherwise vulnerable riser.

During all stages of the operation, the clad riser is also subject to subsurface loop currents. These currents cause significant flexure of the riser joint, with these flexural forces being directly transferred to the buoyancy modules.

The combination of frequent, substantial impacts of the modules with the rotary table plus the high flexural strains applied to the modules by the deflected riser, cracking and full fracture of riser buoyancy modules is now a regular feature of deep water exploration drilling. The repair and replacement of damaged modules has major cost and operational impacts but of far greater importance to the operator are the dropped object hazards to drilling floor personnel and equipment, from break-up of fractured and cracked modules during drill string running and recovery.

The deep water drilling operation demands the use of buoyancy modules of the lowest possible density. Deepwater tolerant, minimum density syntactic foam requires the use of very rigid and therefore relatively brittle resin matrices for the syntactic. It is not commercially of practically viable to utilise flexible, resilient materials. Therefore as relatively brittle materials must be used, there is a requirement for drilling riser modules to incorporate some means whereby the overall structural integrity of the riser module is retained, even after the module has suffered substantial cracking and fracture.

Attempts have been made in the past to provide such residual integrity by means of steel rods or ropes/cables embedded axially in the modules. Both systems can only provide retention of broken sections of modules where the reinforcements actually pass through the broken sections. As there is a practical limit to the number of axial reinforcements that can be included in a module, the residual structural integrity is incomplete. Steel rod reinforcements have the additional disadvantage of increased weigh therefore reduced buoyancy and also create a major safety hazard in the event that the steel rod become exposed due to foam spalling and could potentially spear drilling personnel during riser running and recovery.

An object of the invention is to provide an improved construction for marine buoyancy units and modules.

SUMMARY OF THE INVENTION

According to one aspect of the invention there is provided a marine buoyancy unit composed of synthetic plastics material and having an internal cavity for surrounding one or more elongate objects and a mechanically embedded reinforcement layer close to the outermost surface remote from the cavity. According to another aspect of the invention there is provided a marine buoyancy unit composed of syntactic foam and having an internal cavity for surrounding one or more elongate objects and a mechanically embedded reinforcement layer close to the outermost surface remote from the cavity. It has been found that a layer of fibres near the surface maintains residual structural integrity, yet is light enough not to materially affect buoyancy and does not create any new safety hazard.

Preferably the fibres are high strength polymer fibres. Normally the unit is cylindrical and the layer of fibres is installed on the outward facing curvature of the unit and may advantageously be installed in the areas of the choke and kill lines of the module flats. The fibres are made of tough, rather than brittle material and that they possesses significant elongation at break. This elongation performance may be inherent in the fibre e.g. PE, PP, Nylon, Polycarbonate, PET, PE/PP, copolymers or may be achieved in fibres with lower elongation at break by twisting into ropes e.g., "Kevlar" (RTM). The fibres, which make up the layers are mechanically locked into place within the syntactic foam but should not be tightly bonded in order to allow some limited axial movement in the event of fracture. This is readily achieved by a mesh configuration. The use of a mesh produced from bi-directional bunches of linear fibres embedded in flexible polymer sheathing to which the epoxy syntactic will not bond is preferable.

As cracking failures normally run circumferential in the module, it is preferable, if the mesh system is biased towards greater weight in the axial direction.

As mentioned the mesh is mechanically locked into, rather than bonded to the syntactic foam, it is advantageous but not essential if this mesh is positioned slightly subsurface, preferable 5–25 mm in order to prevent it peeling off the surface after module fracture. This subsurface positioning may be achieved by the use of a thick, open structure lattice material, such as the "Enkamat" mesh system from Colbond (icosynthetics Inc of Enka, N.C., USA. The retention system may advantageously be attached to the open structured spacer material, so that it is positioned in the product when the spacer material is attached to the mold.

In selecting the reinforcing fibre the material is requires to be able to tolerate the temperature conditions achieved during product cure, typically a maximum of 150° C. and also be resistant to degradation in the marine environment. This latter requirement precludes the use of natural fibres such as hemp and sisal, unless they are encapsulated in a water impervious coating.

A material identified as particularly suitable for the reinforcing fibre is the "Sympaforce" range of geogrids, manufactured by Synteen Technical fibres Inc of Lancaster, S.C., USA and Synteen GmbH of Klettgau-Erzingen, Germany. This is a high tenicity PET mesh bonded and encapsulated in PVC "plastisol" paste. Mesh weights between 100 g/m² and 750/m² may be used; with mesh weight being selected to suit the anticipated maximum weight. Meshes with weight and tensile strength biased in the axial direction are preferred, with grades of axial strength of 50–200 kN/m and transverse/circumferential strength of 25–100 kN/m being particularly suitable.

In the event of module fracture due to impact or excessive flexure, the high strength fibre mesh retains all sections of the broken module in nominally the original position. Broken sections are prevented from dropping off the main body of the module, allowing the drilling operation to continue uninterrupted. The broken module can be removed and replaced when production operation allow, typically at the end of the drilling campaign when the riser string is lifted and stored on deck or onshore.

The invention may be understood more readily, and various other features of the invention may become apparent, from consideration of the following description.

BRIEF DESCRIPTION OF THE DRAWING

An embodiment of the invention will now be described, by way of example only, with reference to the accompanying drawings, wherein:

FIG. 1 is and end view of a marine buoyancy modular unit constructed in accordance with the invention and FIG. 2 is a separate view of the structural integrity reinforcement mesh embedded in the unit shown in FIG. 1.

DETAILED DESCRIPTION OF THE INVENTION

As shown in FIG. 1, a marine buoyancy unit 10 of elongated cylindrical form is composed of two complementary sections 2, 3 joined together and separable from one another along a central axial plane 4.

The sections 2, 3 collectively define an internal cavity 5 with a shape determined by the marine object on which the unit 10 is to be fitted. In its simplest form the cavity 5 is defined by the inner bore surface of circular cross section designed to mate with a sub sea riser but as depicted the cavity 5 can have a shape conforming with pipeline 12 surrounded by a group of further lines or conduits 13. The sections 2, 3 collectively define an outer peripheral surface 14. Normally a series of such units 10 would be arranged end-to-end at least partially to enclose the marine object to be protected and to impart buoyancy thereto. The sections 2, 3 of each unit 10 may be held together in a variety of ways, for example, flexible bands (not shown) can be wrapped around the sections 2, 3 or the sections 2, 3 can be shaped to lock together, or alternatively bolted together.

The sections 2, 3 making up the unit 10 are typically fabricated from a thermosetting resin composites, such as epoxy and thermoplastic composites may be used especially such composites with a syntactic foam interior and an outer layer with suitable high performance quality for use in marine applications.

In accordance with the invention the radially outermost region of the unit 10 is reinforced by means of a residual structural integrity reinforcement 6, which is mechanically locked into the unit 10. The reinforcement 6 takes the form of an internal layer close to the outer surface layer preferably 5–25 mm from the outer surface 14. The reinforcement 6 can take the form of fibres which can be arranged as a flexible mesh 7 such as "Sympaforce" incorporated in the sections 2,3 just below the outer surface 14 of unit 10.

Other materials can be used for the reinforcement as discussed in the preamble.

FIG. 2 shows a configuration of a preferred embodiment of mesh structure 7. A number of high strength polymer main strips of fibres 21 running substantially parallel to each other are interconnected with smaller interconnecting fibre strips 23 running perpendicularly to the main strips 21. The mesh structure 7 can be bent into an arc when the sections 2, 3 are moulded to become embedded and mechanically locked into the unit 10.

What is claimed is:

1. A marine buoyancy unit for mounting upon a subsea riser, the unit having a longitudinal axis and comprising at least two complementary sections which are separable from one another along an axial plane, the sections being adapted to be joined together around the riser, forming when so joined an internal cavity which receives the riser, the sections being composed of synthetic buoyant plastic material and each having a reinforcement layer disposed within the buoyant plastic material close to an outermost surface thereof remote from the cavity, the reinforcement layer comprising high strength fibers which extend longitudinally of the buoyancy unit and are embedded in and mechanically locked into place within the buoyant plastic material by not tightly bonded to it, in order to allow limited axial movement in the event of fracture of the buoyancy unit, whereby the reinforcement layer serves to maintain residual structural integrity following fracture of the buoyancy unit.

2. The unit according to claim 1 and of cylindrical form.

3. The unit according to claim 1 wherein the reinforcement layer is positioned 5–25 mm beneath the outermost surface.

4. The unit according to claim 1, wherein the reinforcement layer consists of fibers of a high strength polymer.

5. The unit according to claim 4, wherein the high strength polymer is PVC plastisol.

6. The unit according to claim 1 wherein the reinforcement layer is an open mesh.

* * * * *